United States Patent [19]
Yohe et al.

[11] Patent Number: 5,682,514
[45] Date of Patent: Oct. 28, 1997

[54] APPARATUS AND METHOD FOR INCREASED DATA ACCESS IN A NETWORK FILE ORIENTED CACHING SYSTEM

[75] Inventors: Thomas Patrick Yohe, Centerville; Gordon L. Dorworth, Spring Valley, both of Ohio

[73] Assignee: Stampede Technologies, Inc., Dayton, Ohio

[21] Appl. No.: 565,393

[22] Filed: Nov. 30, 1995

[51] Int. Cl.[6] ............................ G06F 12/08; H04L 12/00
[52] U.S. Cl. ...................... 395/445; 395/449; 395/200.09
[58] Field of Search ............................... 395/445, 449, 395/200.09

[56] References Cited

U.S. PATENT DOCUMENTS

| | | | |
|---|---|---|---|
| 4,410,944 | 10/1983 | Kronies | 395/474 |
| 5,222,224 | 6/1993 | Flynn et al. | 395/471 |
| 5,226,143 | 7/1993 | Baird et al. | 395/472 |
| 5,261,051 | 11/1993 | Masden et al. | 395/479 |
| 5,261,069 | 11/1993 | Wilkinson et al. | 395/472 |
| 5,274,787 | 12/1993 | Hirano et al. | 395/470 |
| 5,276,835 | 1/1994 | Mohan et al. | 395/440 |
| 5,297,269 | 3/1994 | Donaldson et al. | 395/457 |
| 5,301,290 | 4/1994 | Tetzlaff et al. | 395/469 |
| 5,394,555 | 2/1995 | Hunter et al. | 395/800 |
| 5,404,483 | 4/1995 | Stamm et al. | 395/471 |
| 5,428,761 | 6/1995 | Herlihy et al. | 395/457 |
| 5,452,447 | 9/1995 | Nelson et al. | 395/621 |
| 5,544,320 | 8/1996 | Konrad | 395/200.09 |

*Primary Examiner*—Krisna Lim
*Attorney, Agent, or Firm*—R. William Graham

[57] ABSTRACT

An apparatus for increased data access in a file oriented network comprises a file server computer having an operating system, a first memory, a permanent storage memory and a processor, a cache verifying computer operably connected to the file sever computer in a manner to form a network for rapidly transferring data, the cache verifying computer having an operating system, a first memory and a processor with means for performing an operation on data stored in the permanent storage memory of the file server computer to produce a signature of the data, a remote client computer having an operating system, a first memory, a cache memory and a processor with means for performing an operation on data stored in the cache memory to produce a signature of the data, a communication server operably connecting to the remote client computer to the cache verifying computer and the file sever computer, and a comparator operably associated with the cache verifying computer for comparing the signatures of data with one another to determine whether the signature of data of the remote client is valid.

12 Claims, 10 Drawing Sheets he present invention relates to data access in a file oriented network system. More particularly, the present invention is directed to a client-agent-server utility which increases the speed in which data is accessed across slow link communications via remote node caching and verifying.

APPARATUS AND METHOD FOR INCREASED DATA ACCESS IN A NETWORK FILE ORIENTED CACHING SYSTEM

BACKGROUND OF THE INVENTION

1. Field of the Invention

The present invention relates to data access in a file oriented network system. More particularly, the present invention is directed to a client-agent-server utility which increases the speed in which data is accessed across slow link communications via remote node caching and verifying.

2. Related Art

Many operating systems are equipped to handle caching and verifying of data. Traditionally, in a remote client's caching system, optimization in retrieving data is limited to prefetching. In other words, an application program in a remote client requests from a file server transmission of a predetermined number of bytes of information (e.g., x bytes) and the operating system on the client prefetches the requested data plus another number of bytes of information (e.g., x+y bytes). Thus, when the application requests the bytes, it already exists in its readily accessible memory (cache).

In a desktop caching system, a high speed memory is used to cache data that is stored on a hard disk. While a desk-top cache program, such as Microsoft's SmartDrive is a useful tool to increase performance from the random access memory (RAM), this type of caching technique is not applicable to remote environments because of its inability to correctly handle multiple remote clients accessing the same data files concurrently, i.e., it is likely to corrupt the data.

File servers have employed caching techniques which parallel techniques of the desktop. Here, the file server deviates in protecting against multiple common data user access by implementing or providing a file locking service to clients.

As shown in FIG. 1, the related art includes a remote client computer having an operating system (OS) with a file system interface (FSI). Operatively connected to the FSI is a local file system (LFS) which in turn is operatively connected to a RAM based disk cacher (RBDC), disk driver (DD) and permanent storage disk (PSD). Also, operatively connected to the FSI is a network file redirector (NFR) with prefetch capability, and a network transport layer (NTL) connected to a WAN driver. Aside from the OS, there exist application programs (AP) which employ the OS via the FSI. A communication server (CS) connects to the remote client computer and includes a WAN driver, routing layer and LAN driver.

The CS connects through a LAN link to a file server computer having an OS. The file server computer OS includes an NTL connected to a LAN driver and an FSI connected to LFS which in turn is connected to an RBDC, a DD and a PSD. Aside from the OS, there exists a file server application which employs the OS via the FSI.

The problem associated with these prior systems is their inability to provide a remote client user with greater speed of access to file server data. This is especially so because of the type of link in which the remote client may be accessing the data through, such as a modem phone link. In the context of the present invention, "remote client" is defined as a user, accessing data over a relatively slow link, such as a modem phone link. A typical modem phone link provides a transfer rate of about 28.8 kilobits of information per second. This is contrasted with a link in a LAN connection which can transfer at about 10 Megabits per second. These remote clients are thus greatly limited in speed of access.

SUMMARY OF THE INVENTION

The present invention overcomes the above described deficiencies which exist with remote clients accessing data from a file oriented network environment.

It is an object to increase the speed in which a remote client can access data.

It is another object to maintain integrity of the accessed data while increasing the speed in which the data is accessed.

A further object is to implement an agent to act as a caching verifier between a remote client and a file server.

Still, another object is to add intelligence to a remote client in order to reduce the overall time in which a remote client accesses data.

Another object is to overcome the deficiencies of data transfer for a remote client.

Other objects and advantages will be readily apparent from reading the following description and viewing the drawings.

Accordingly, the present invention is directed to an apparatus for increased data access in a network, which includes a file server computer having a permanent storage memory, a cache verifying computer operably connected to the file server computer in a manner to form a network for rapidly transferring data, the cache verifying computer having an operating system, a first memory and a processor with means for performing an operation on data stored in the permanent storage memory of the file server computer to produce a signature of the data, a remote client computer having an operating system, a first memory, a cache memory and a processor with means for performing an operation on data stored in the cache memory to produce a signature of the data, a communication server operably connected to the remote client computer to the cache verifying computer and the file server computer and a comparator operably associated with the cache verifying computer for comparing the signatures of data with one another to determine whether the signature of data of the remote client is valid.

Additionally, the remote client computer includes means responsive to each comparison performed by the comparator on the data for generating and storing a validation ratio for the data in the first memory and for removing the data from the cache memory when the validation ratio drops below a predetermined value. Also, the cache verifying computer includes means for recognizing a LOCK request from the remote client computer and for obtaining a lock on the data from the file-server computer in response to the LOCK request.

TERMINOLOGY

"Permanent storage memory," as used herein, includes, but is not limited to, disk drive, flash RAM or bubble memory, for example.

"File oriented distributed network," as used in the present invention, will include a network wherein the file server computer data is accessed via the following set of file system primitives: OPEN, CREATE, READ, WRITE, SEEK, LOCK, UNLOCK AND CLOSE.

"Caching" is the function of retrieving an object from a relatively high speed storage device from a list of most-recently-used objects.

"Cache" is a file which resides in permanent storage and contains the most-recently-used blocks of data read from a remote file server.

"File server computer" is a computer which includes a processor with its associated memory, an operating system, and a permanent storage memory.

"Reverse channel" is the means by which a response message is sent over the same network layer interface in which a request was received

DETAILED DESCRIPTION OF A PREFERRED EMBODIMENT

In the description which follows, the representation of the present invention is in part presented in terms of program operations executed on a file oriented distributed network of computers, but may as well be applicable to distributed file oriented network systems. The operations are steps leading to a certain result. Typically, these steps take the form of electrical signals which are manipulated, stored, transmitted, combined, compared or otherwise operated upon by a particular computer in the network. For simplicity, these signals may be referred to herein as bits, bytes or data.

The following description describes solutions to the problems associated with a remote client computer's ability to access specified data from a file server computer located on a network. An apparatus and method are disclosed which permit the remote client computer to reduce the time for accessing such data using a cache verifying computer coupled with a caching technique.

The performance gains realized by the present invention are derived from the fact that remote clients tend to repetitively access the same data by performing file reads. If a copy of the data can be stored in the permanent storage memory of the remote client computer and also verified to be current when it is subsequently retrieved, this will improve performance significantly. This is because it requires much less bandwidth to verify a block of data than it would to actually transfer a block of data.

Figure 1:
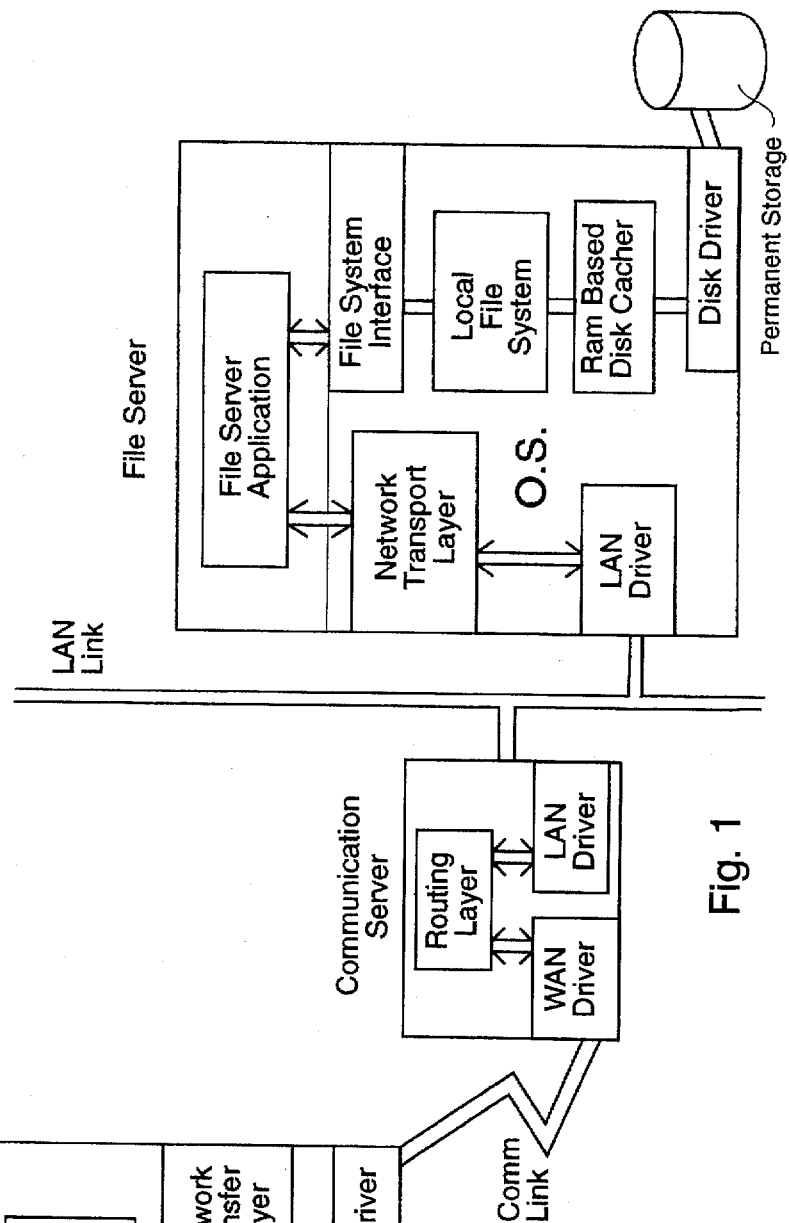
FIG. 1 illustrates the block diagram configuration of the related art.
Figure 1:
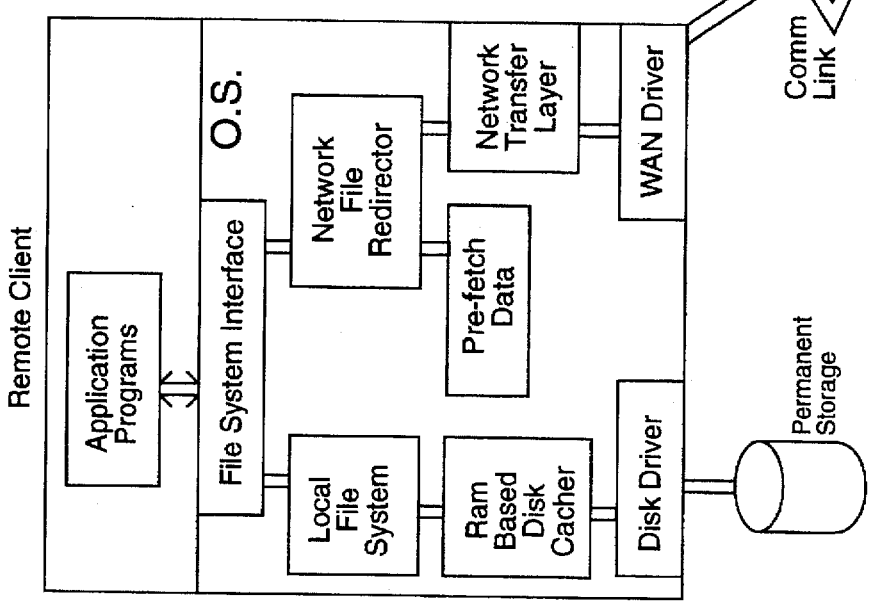
Figure 2:
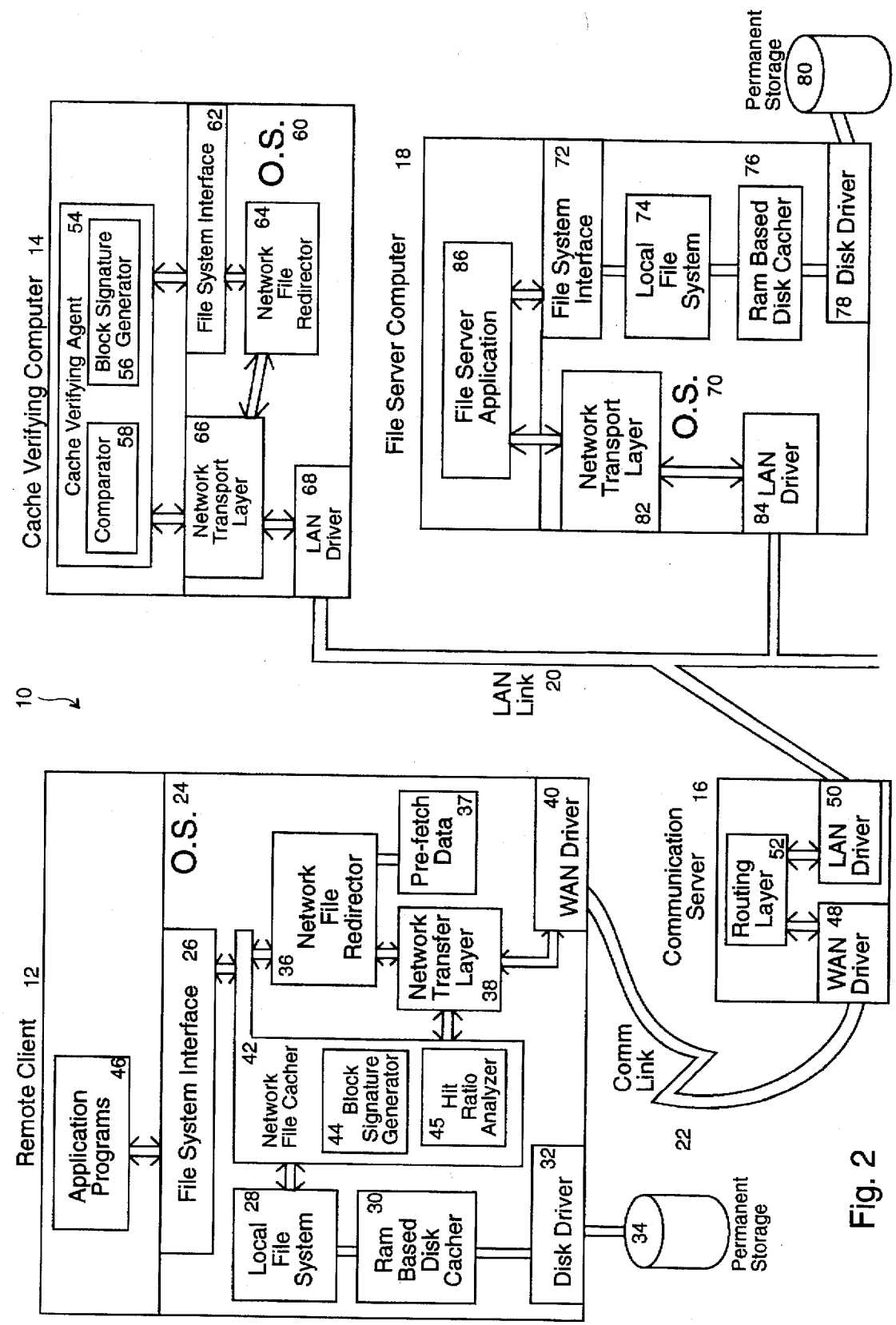
FIG. 2 illustrates the block diagram configuration of the present invention.
Figure 3:
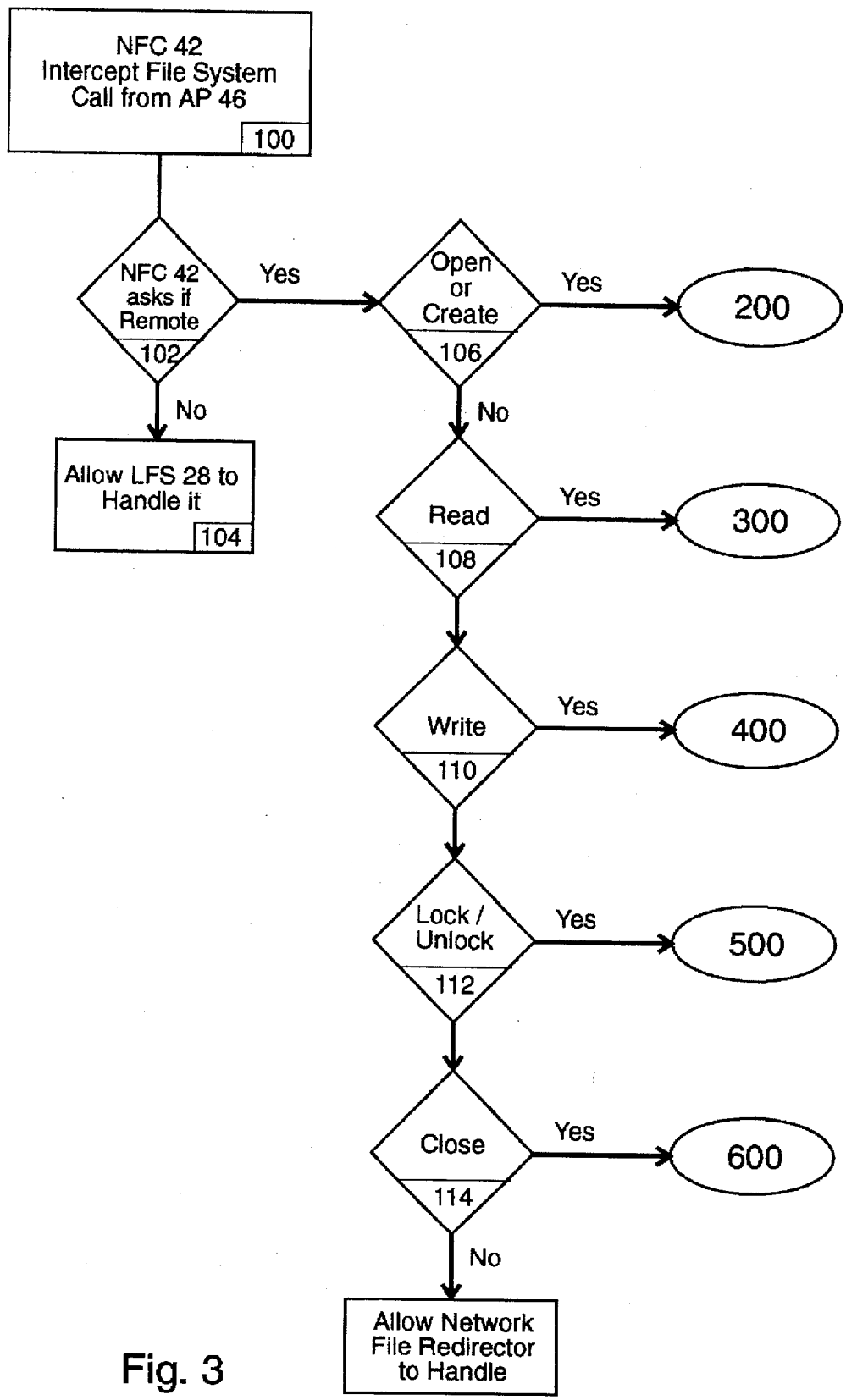
FIG. 3 illustrates a flow chart of the operations of the present invention corresponding to the requests within a remote client.
Figure 4:
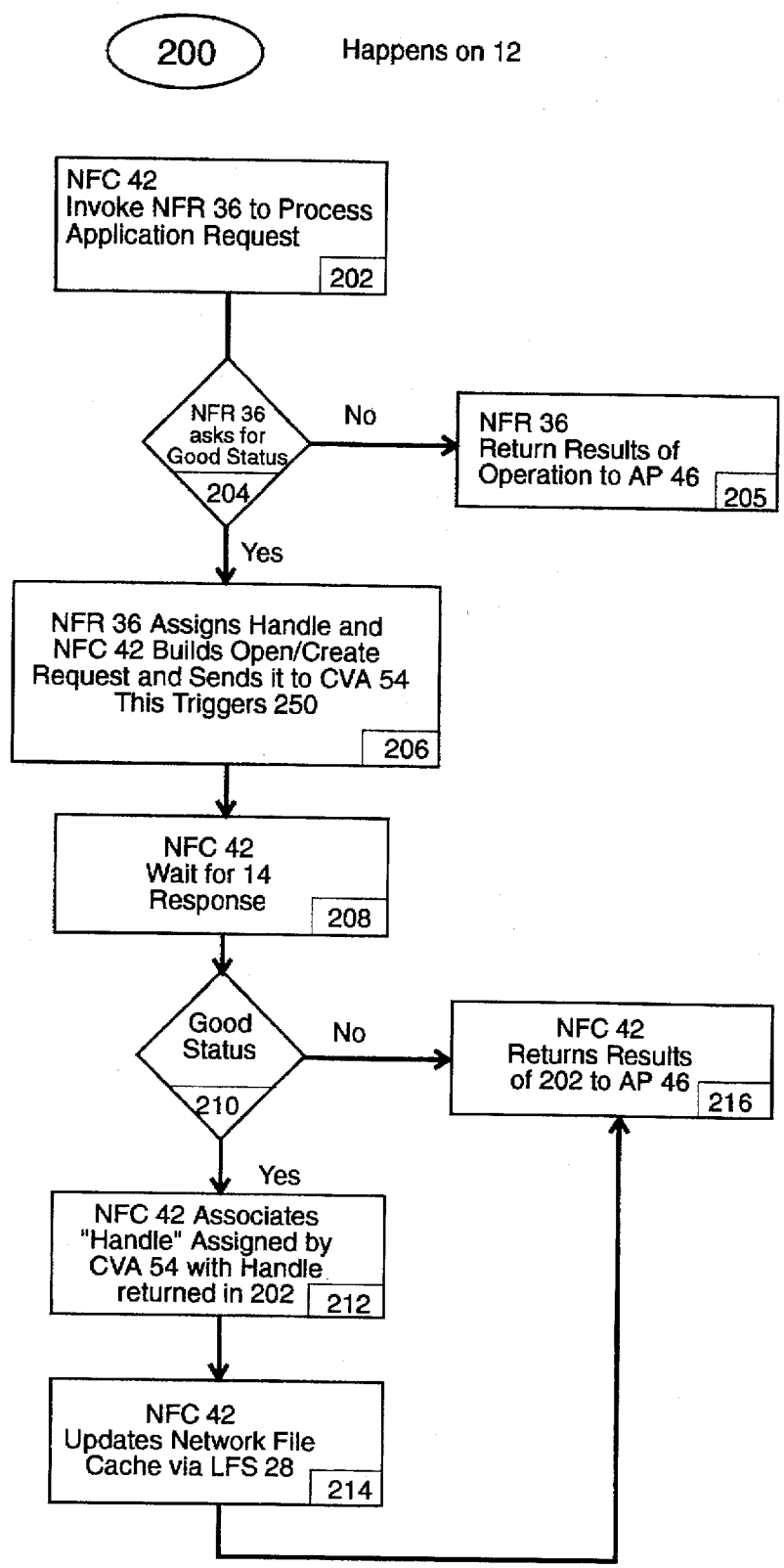
FIG. 4 illustrates a flow chart of the operations of the present invention corresponding to OPEN/CREATE requests on remote client computer.
Figure 5:
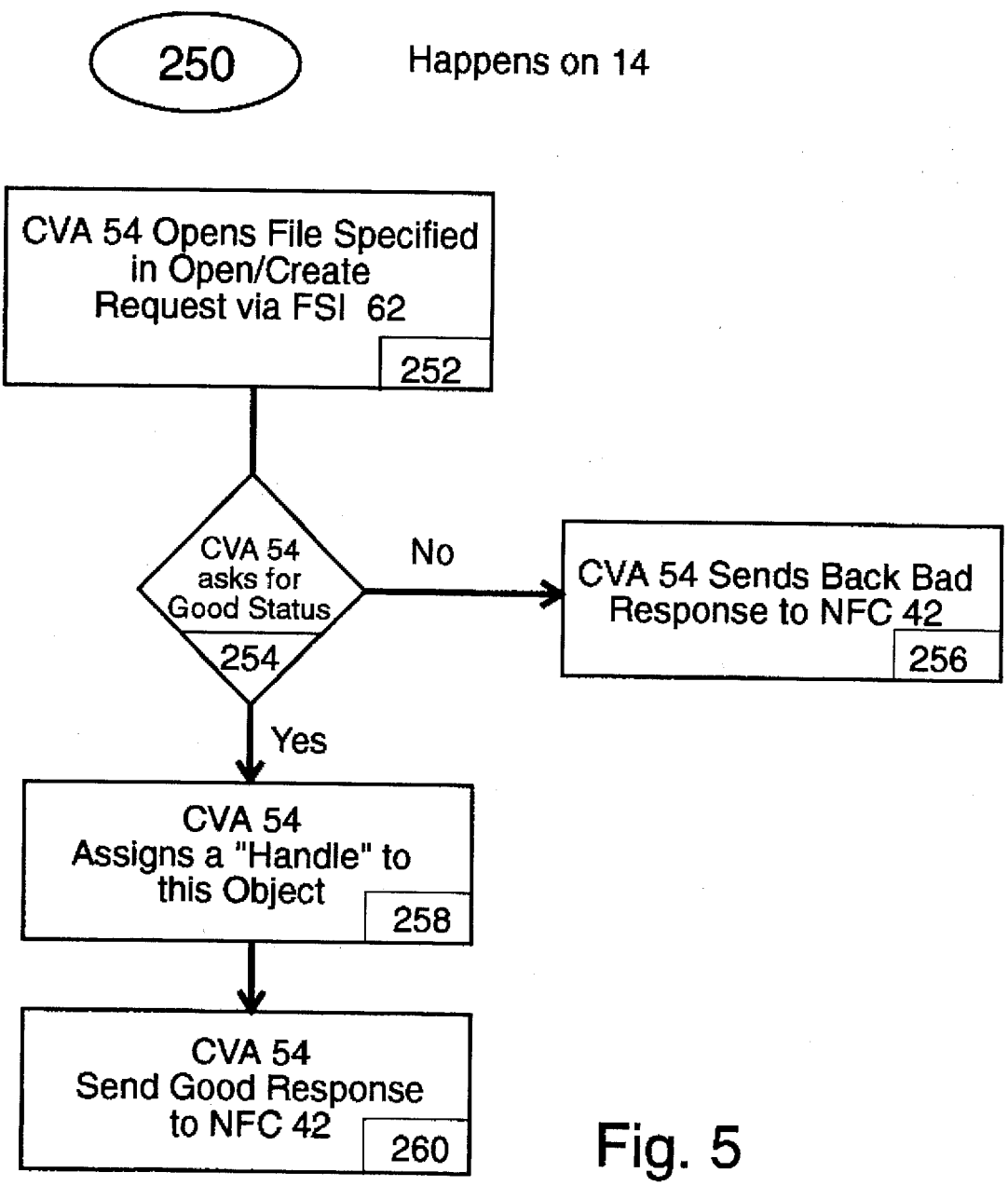
FIG. 5 illustrates a flow chart of the operations of the present invention corresponding to OPEN/CREATE requests on cache verifying computer.
Figure 6:
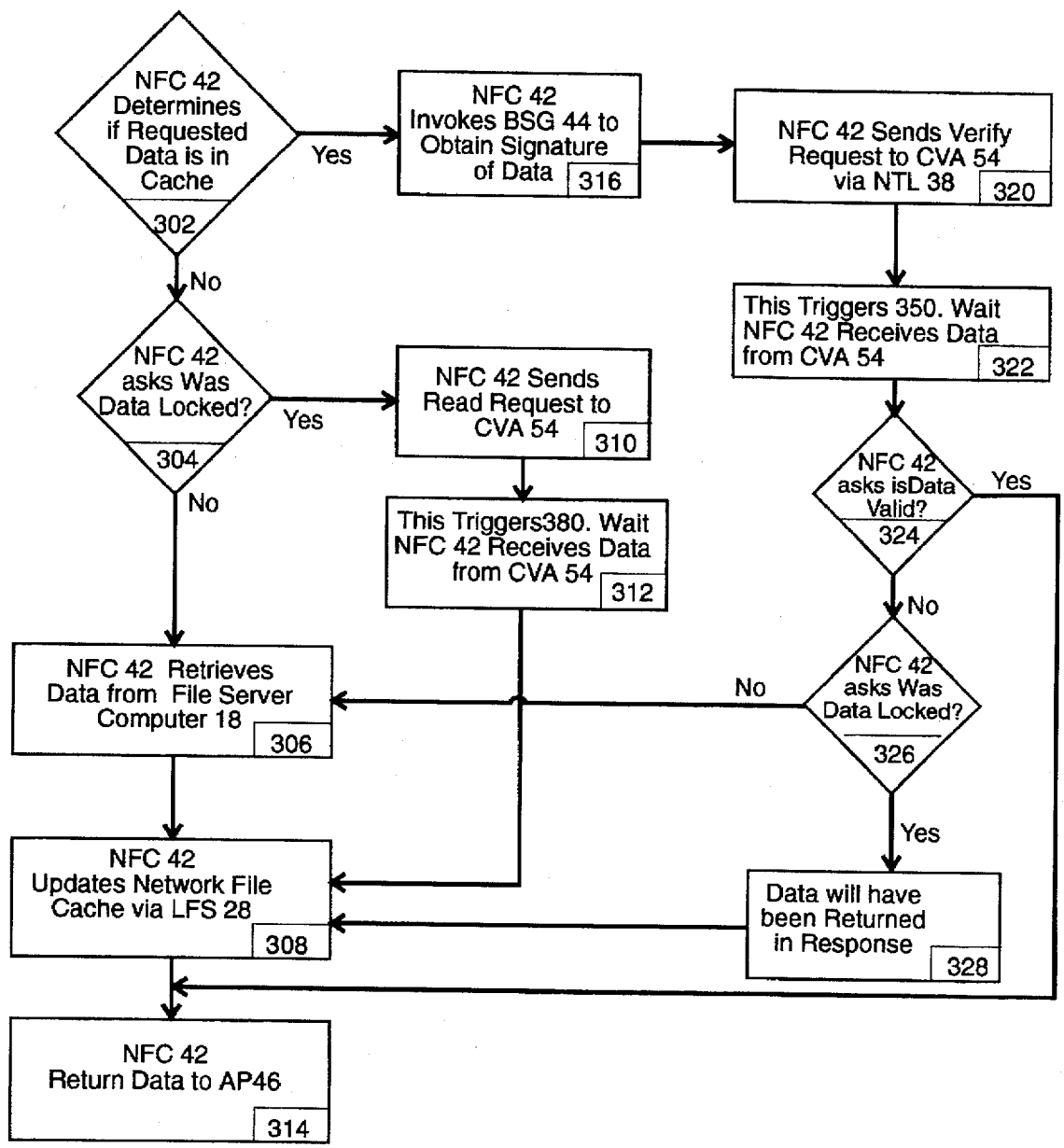
FIG. 6 illustrates a flow chart of the operations of the present invention corresponding to READ requests on remote client computer.
Figure 7:
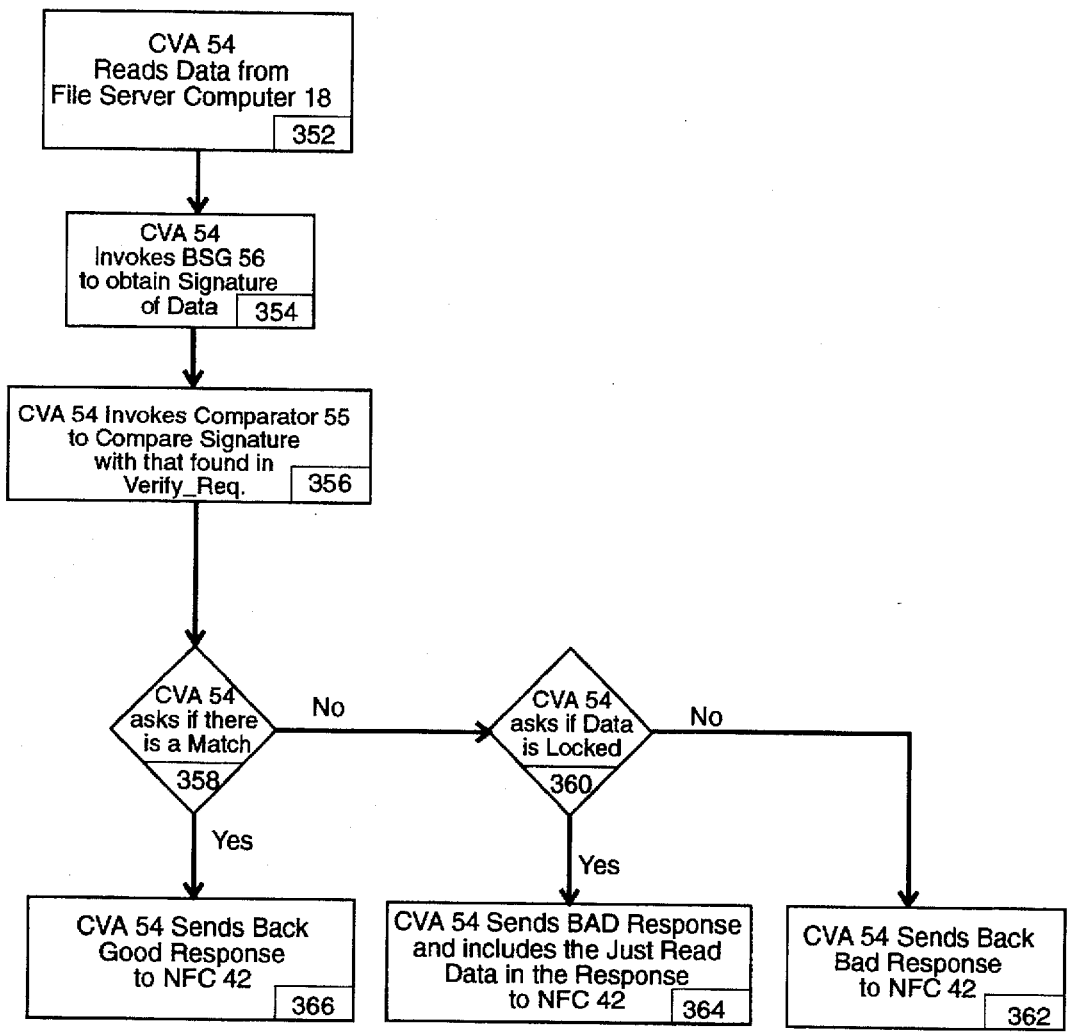
FIG. 7 illustrates a flow chart of the operations of the present invention corresponding to READ requests on cache verifying computer.
Figure 8:
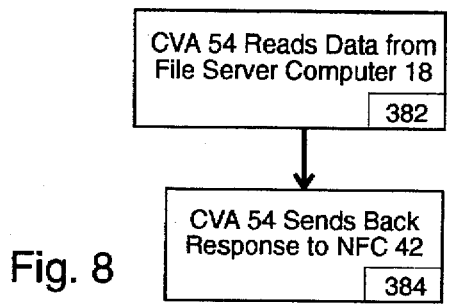
FIG. 8 illustrates a flow chart of additional operations of the present invention corresponding to READ requests in the cache verifying computer.
Figure 9:
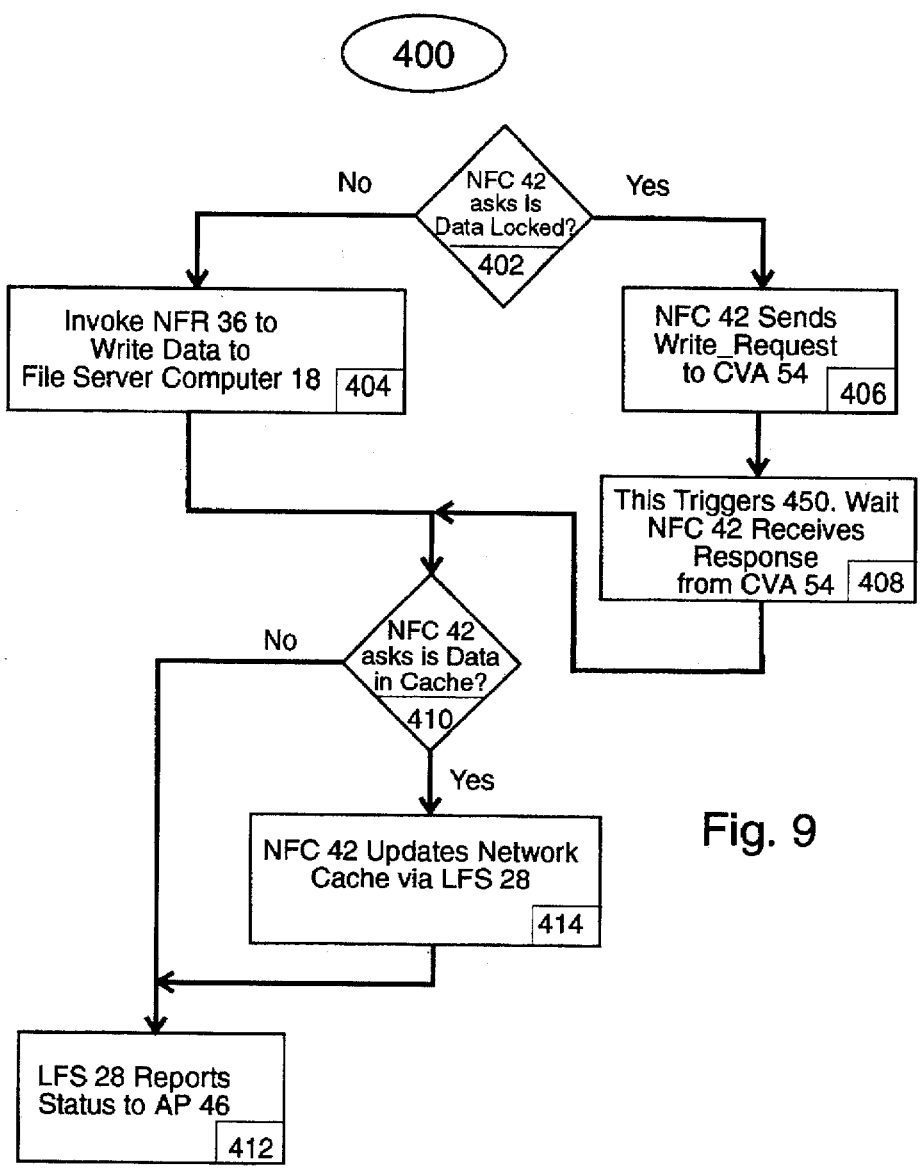
FIG. 9 illustrates a flow chart of the operations of the present invention corresponding to WRITE requests on remote client computer.
Figure 10:
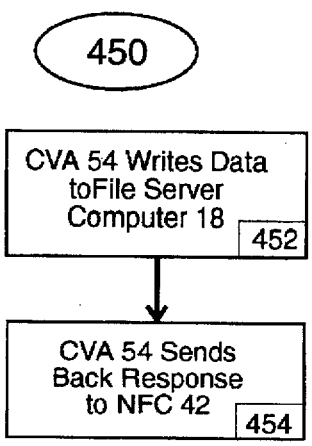
FIG. 10 illustrates a flow chart of the operations of the present invention corresponding to WRITE requests on cache verifying computer.
Figures 11, 12:
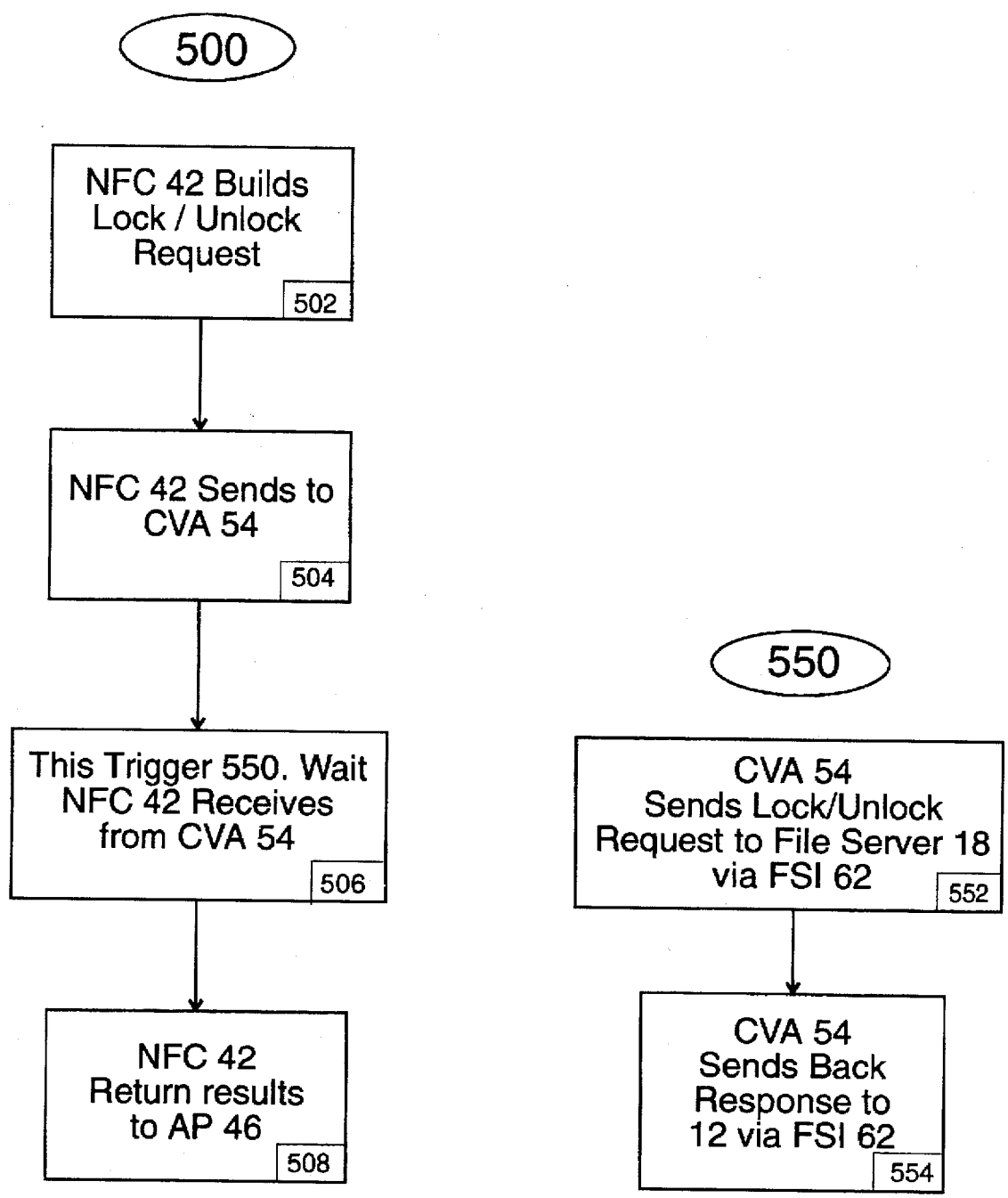
FIG. 11 illustrates a flow chart of the operations of the present invention corresponding to LOCK requests on remote client computer.
FIG. 12 illustrates a flow chart of the operations of the present invention corresponding to LOCK requests on cache verifying computer.
Figures 13, 14:
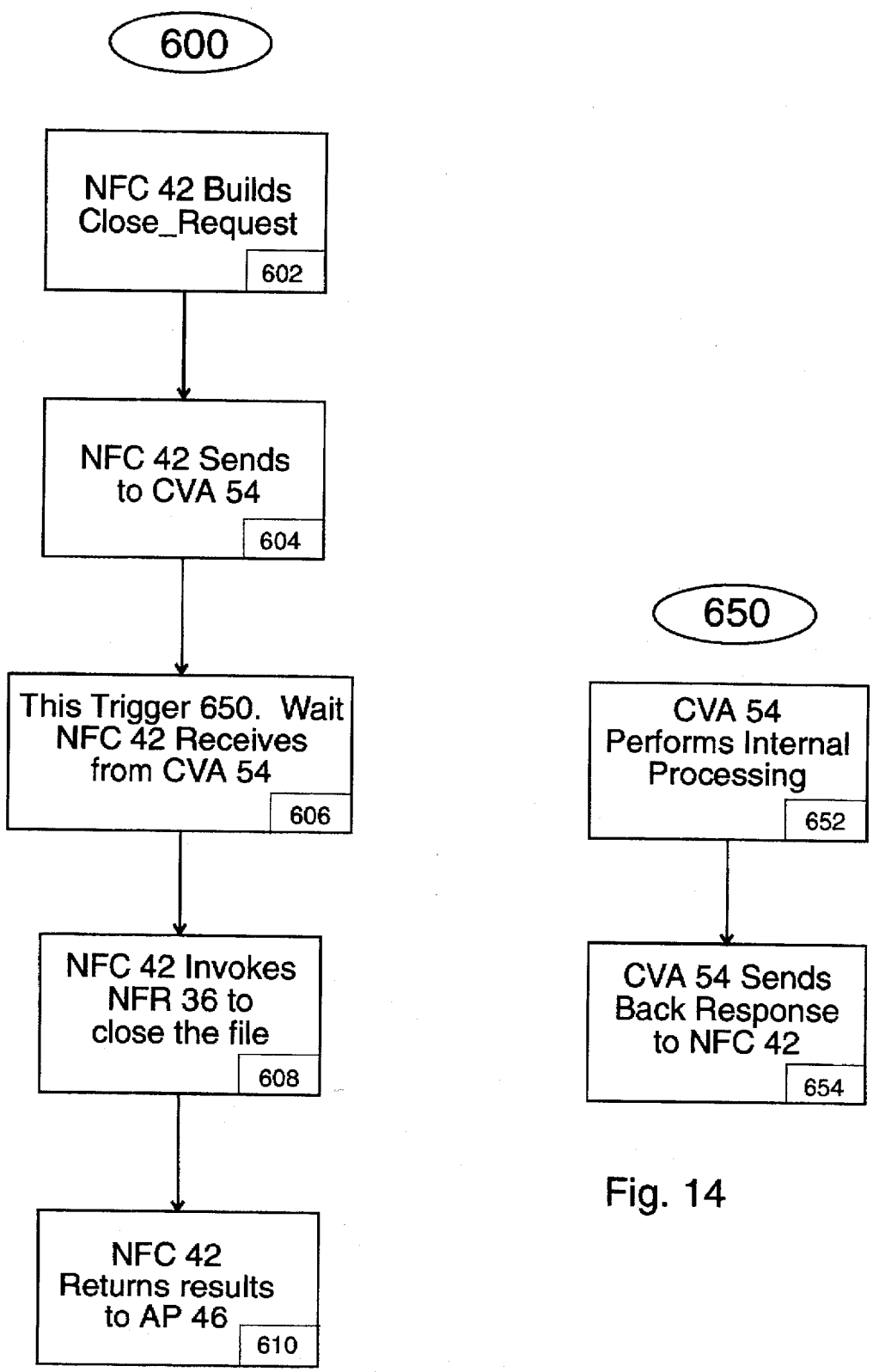
FIG. 13 illustrates a flow chart of the operations of the present invention corresponding to CLOSE requests on remote client computer.
FIG. 14 illustrates a flow chart of the operations of the present invention corresponding to CLOSE requests on cache verifying computer.

Referring now to the FIGS. 2–14, the present invention is a network computer system 10 having at least one remote client computer 12, cache verifying computer 14, communication server 16 and file server computer 18. The cache verifying computer 14 and file server computer 18 are connected via a local area network (LAN) link 20. The communication server 16 links the remote client computer 12 to the LAN 20, which in turn permits communication with the cache verifying computer 14 and the file sever computer 18.

The remote client computer 12 communicates via communication link 22 to the communication server 16. The communication server 16 can be of a type such as that provided by Cisco, 3Com, Shiva, etc., which will act as a router of traffic between the LAN 20 and communication link 22. The LAN 20 can be Ethernet or Token Ring, for example.

The remote client computer 12 has an operating system (OS) 24 with a file system interface (FSI) 26. Operatively connected to the FSI 26 is a local file system (LFS) 28 which in turn is operatively connected to a RAM based disk cacher (RBDC) 30, disk driver (DD) 32 and permanent storage disk (PSD) 34. A network file redirector (NFR) 36 with prefetch data 37, operatively connects to a network transport layer (NTL) 38 which in turn is connected to a WAN driver 40. Additionally, the invention includes a network file cacher (NFC) 42 which is operably disposed between and interconnects the FSI 26 and NFR 36. The NTL 38 operatively connects to the NFC 42. Also, the NFC 42 operatively connects to the LFS 28. The NFC 42 includes a block signature generator (BSG) 44 and hit ratio analyzer (HRA) 45, which will be more fully described hereinafter. Aside from the OS, there exists on the computer 12 application programs (AP) 46 which employ the OS 24 via FSI 26.

The communication server (CS) 16 includes a WAN driver 48, a LAN driver 50 and routing layer (RL) 52 operatively interconnecting the WAN driver 48 and the LAN 50 driver.

The cache verifying computer 14 includes a cache verifying agent (CVA) 54 having a BSG 56 (of the type described herein) and a comparator 58. Also, included is an OS 60 having an FSI 62 operatively connected to CVA 54, an NFR 64 operatively connected to the FSI 62, an NTL 66 operatively connected to the NFR 64 and CVA 54, and a LAN driver 68 operatively connected to the NTL 66.

The file server computer 18 includes an OS 70 having an FSI 72 which is operatively connected to an LFS 74 which in turn is connected to an RBDC 76, a DD 78 and a PSD 80. Also, the OS 70 includes an NTL 82 operatively connected to a LAN driver 84. A file server application (FSA) 86 exists on the computer 18 which is operably connected to both the NTL 82 and FSI 72.

It should be noted that one skilled in the art can modify the basic network computer to accomplish the objects set forth herein and that such modifications are believed to fall within the scope of the claims appended hereto. Alternatively, for example, the cache verifying agent 54 could reside as part of the communication server 16 or as a stand alone computer with its own memory and operating system. Still, other persons skilled in the art will appreciate the verifying agent can be implemented in other manners to accomplish the goals set forth herein.

The operation of the system is as follows and as represented in FIGS. 3-14. The operations discussed hereafter assumes connections have been made among all computers 12, 14 and 18 and communication server 16.

On the remote client computer, AP 46 makes requests from a file server wherein the NFC 42 will intercept a file system call 100 from the AP 46 and query whether the object to be acted upon is "remotely located?" 102. If the answer is no, the NFC 42 "instructs" 104 the LFS 28 to handle the object request. If yes, the type of request is ascertained and handled accordingly as follows.

In the case of OPEN or CREATE 106 requests, the NFC 42 follows the operation under 200. The NFC 42 "invokes" 202 the NFR 36 to process the request. The NFC 42 asks "whether there is a good status" 204 for the request. If no, NFC 42 "returns" 205 the results of the operation to AP 46. If yes, the NFR 36 assigns a handle thereto and the NFC 42 "builds and sends" 206 an OPEN/CREATE request to CVA 54 via NTL 38 which triggers operation 250.

CVA 54 "opens" 252 a file specified in OPEN/CREATE request via FSI 62, NFR 62 and NTL 66. The CVA 54 asks "whether there is a good status on the file?" 254. If the answer is no, CVA 54 "sends" 256 the bad response back to NFC 42 in a reverse channel. If the answer is yes, CVA 54 "assigns a handle to the object" 258 and "sends" 260 a good response via a reverse channel.

NFC 42 via NTL 38 "receives the response" 208 from CVA 54 and "asks for a good status?" 210. If the answer is no, the NFC 42 "returns the results of the original OPEN/CREATE request" 216 to AP 46. If the answer is yes, then the NFC 42 "associates 212 the handle assigned by the CVA 54 with the handle returned by the NFR 36 in operation 202. The NFC 42 "updates" 214 the network file cache via LFS 28 and "returns the results obtained by NFR 36" 216 to AP 46 via FSI 26.

In the case of a READ 108 requests, the computer 12 follows the operation 300. Via the FSI 26 and LFS 28, the NFC 42 "determines if the requested data is in cache?" 302. If the answer is no, a subquery becomes "is the data locked?" 304. To this subquery, if the answer is no, the NFC 42 "retrieves" 306 the data via NFR 36 from the file server computer 18 and the NFC 42 "updates" 308 the network file cache via LFS 28. If the answer to the subquery is yes, the NFC 42 via the NTL 38 "sends" 310 a READ request to CVA 54 which triggers 380. CVA 54 via the FSI 62 "reads" 382 the data from the file server computer 18. The CVA 54 "sends" 384 a response back to NFC 42, wherein the data is "received" 312 and "updated" 308 as described above. The retrieved data is "returned" 314 by the NFC 42 to AP 46.

If the data is in cache, NFC 42 is triggered to "invoke" 316 the BSG 44 to generate a signature of data. NFC 42 via NTL 38 "sends" 320 a VERIFY request having the first signature of data therein to CVA 54 which triggers 350.

CVA 54 via FSI 62 "reads" 352 data from the file server computer 18. CVA 54 "invokes" 354 BSG 56 to generate a second signature of data. CVA 54 "invokes" 356 comparator 58 to compare the first and second signatures of data and "asks whether there is a match?" 358. If the answer is no, CVA 54 "asks if data is locked?" 360. If no, the CVA 54 "sends" 362 back a bad response to NFC 42 via a reverse channel. If yes, CVA 54 "sends" 364 back a bad response to NFC 42 along with read data via a reverse channel. If there is a match of the signatures, CVA 54 "sends" 366 a good response back to NFC 42 via a reverse channel.

The NFC 42 receives 322 the response from CVA 54 and asks "is the data valid?" 324. If no, NFC 42 asks "is the data locked?" 326. If not locked, the NFC 42 retrieves data 306 as described above. If locked, data will have been "returned" 328 for updating per 308. If the data was valid, NFC 42 returns the data to AP 46.

In the case of a WRITE 110 request, the computer 12 follows the operation 400. The NFC 42 "asks is the data locked?" 402. If no, the NFR 36 is invoked to "write" 404 to the file server computer 18. If the data is locked, NFC 42 via NTL 38 "sends" 406 a WRITE request to CVA 54 which triggers 450. CVA 54 "writes" 452 data to file server computer 18 via FSI 62. CVA 54 "sends" 454 back a response to NFC 42 which "receives" 408 the response. The NFC 42 "asks is the data in cache?" 410. If no, LFS 28 "reports status" 412 to AP 46. If yes, NFC 42 "updates" 414 network cache via LFS 28 and "reports status" 412 to AP 46.

In the case of LOCK/UNLOCK 112 request, operation 500 is employed. The NFC 42 "builds" 502 an LOCK/UNLOCK request. The NFC 42 via NTL 38 "sends" 504 the LOCK/UNLOCK request to CVA 54 which triggers operation 550. CVA 54 "sends" 552 an LOCK/UNLOCK request to the file server computer 18 via FSI 62. CVA 54 "sends" 554 a response back to NFC 42 via a reverse channel. The NFC 42 "receives" 506 the response and "returns" 508 the results to AP 46.

In the case of a CLOSE 114 request, operation 600 is employed. The NFC 42 "builds" 602 a CLOSE request. The NFC 42 via NTL 38 "sends" 604 the CLOSE request to CVA 54 which triggers operation 650. CVA 54 "performs" 652 internal processing of the request. CVA 54 "sends" 654 a response back to NFC 42. The NFC 42 "receives" 606 the response and invokes the NFR 36 to "close" 608 the file and "return" 610 the results to AP 46.

By way of example, the following packet formats define this client server protocol:

```
//
// TYPE DEFINITIONS
//
    BYTE =>an 8 bit value (octet) unsigned
    DWORD => a 16 bit value in which network byte ordering is not
        important
    WORD => 32 bit value in which network byte ordering is not
        important
    MDWORD=> 32 bit value in which network byte ordering is impor-
        tant and represented using "motorola" or "big endian" format
// START CONNECTION REQUEST
    typedef struct {
        BYTE bFunctionCode; // always 0x00
        BYTE bResv; //
        WORD wSequenceValue; //
    }CVP_START_CONNECTION_REQ, *pCVP_START_
        CONNECTION_REQ;
// START CONNECTION RESPONSE
    typedef struct {
        BYTE bFunctionCode;      // always 0x80
        BYTE bStatus;       //
        WORD wSequenceValue // Same value as in request
```

```
        DWORD dConnectionHandle; //
}CVP_START_CONNECTION_RSP, *pCVP_START_
    CONNECTION_RSP;
// END CONNECTION REQUEST
    typedef struct {
        BYTE bFunctioncode; //always 0x01
        BYTE bResv;        //
        WORD wSequenceValue; //
        DWORD dConnectionHandle; // // as returned on start connection
}CVP_END_CONNECTION_REQ, *CVP_END_
    CONNECTION_REQ;
//END CONNECTION RESPONSE
    typedef struct {
        BYTE bFunctionCode; //always 0x81
        BYTE bStatus;      //
        WORD wSequenceValue; // Same value as in request
}CVP_END_CONNECTION_RSP, *pCVP_END_
    CONNECTION_RSP;
// OPEN OR CREATE FILE REQUEST
    typedef struct {
        BYTE bFunctionCode; // always 0x02
        BYTE bResv; //
        WORD wSequenceValue; //
        DWORD dConnectionHandle; // As returned on START_CONNECT
        MDWORD dFileAttributesMask; //
        BYTE zFilePath[512]; //null terminated file name
}CVP_OPEN_OR_CREATE_FILE_REQ, *pCVP_
    OPEN_OR_CREATE_FILE_REQ;
//OPEN OR OR CREATE FILE RESPONSE
    typedef struct {
        BYTE bFunctionCode; // always 0x82
        BYTE bStatus;      //
        WORD wSequenceValue; // Same value as in request
        DWORD dVerifiersFileHandle; //
} CVP_OPEN_OR_CREATE_FILE_RSP, *pCVP_
    OPEN_OR_CREATE_FILE_RSP;
// CLOSE FILE REQUEST
    typedef struct {
        BYTE bFunctionCode; // always 0x03
        BYTE bResv;  //
        WORD wSequenceValue; //
        DWORD dConnectionHandle; // As returned on START_CONNECT
        DWORD dVerifiersFileHandle; // As returned on OPEN_OR_
            CREATE
}CVP_CLOSE_FILE_REQ, *pCVP_CLOSE_FILE_REQ;
// CLOSE FILE RESPONSE
typedef struct {
        BYTE bFunctionCode; // always 0x83
        BYTE bStatus; //
        WORD wSequenceValue; // Same value as in request
} CVP_CLOSE_FILE_RSP, *pCVP_CLOSE_FILE_RSP;
// LOCK REGION REQUEST
    typedef struct {
        BYTE bFunctionCode; // always 0x04
        BYTE bResv; //
        WORD wSequenceValue; //
        DWORD dConnectionHandle; // As returned on START_CONNECT
        DWORD dVerifiersFileHandle; // As returned on OPEN_OR_
            CREATE
        MDWORD dSeekValue; //offset into file
        MDWORD dLength; //number of bytes to lock
}CVP_LOCK_REGION_REQ, *pCVP_LOCK_REGION_REQ;
//LOCK REGION RESPONSE
    typedef struct {
        BYTE bFunctionCode; // always 0x84
        BYTE bStatus; //
        WORD wSequenceValue; // Same value as in request
        DWORD    dVerifiersLockHandle;
} CVP_LOCK_REGION_RSP, *pVCP_LOCK_REGION_RSP;
//UNLOCK REGION REQUEST
    typedef struct {
        BYTE bFunctionCode; // always 0x05
        BYTE bResv; //
        WORD wSequenceValue; //
        DWORD dConnectionHandle; //As returned on START_CONNECT
        DWORD dVerifiersLockHandle; // As returned LOCK REGION
} CVP_UNLOCK_REGION_REG, *pCVP_UNLOCK_REGION_
    REQ;
// UNLOCK REGION RESPONSE
typedef struct {
        BYTE bFunctionCode;  // always 0x85
        BYTE bStatus;
        WORD wSequenceValue; // Same value as in request
}CVP_UNLOCK_REGION_RSP. *pCVP_UNLOCK_REGION_RSP;
// VERIFY REGION REQUEST
    typedef struct {
        BYTE bFunctionCode; // always 0x06
        BYTE bResv;
        WORD wSequenceValue; //
        DWORD dConnectionHandle; // As returned on START_CONNECT
        DWORD dVerifiersFileHandle; // As returned on OPEN_OR_
            CREATE
        MDWORD dSeekValue; // offset into file
        MDWORD dLength; //number of bytes to verify
        BYTE Signature[8]; //CRC adaptation
} CVP_VERIFY_REGION_REQ, *pCVP_VERIFY_REGION_REQ;
// VERIFY REGION RESPONSE #1 (not locked data)
    typedef struct {
        BYTE bFunctionCode; // always 0x86
        BYTE bStatus;    //
        WORD wSequenceValue; //same value as in request
} CVP_VERIFY_REGION_RSP,*pCVP_VERIFY_REGION_RSP;
//
// VERIFY REGION RESPONSE #2
// (if signature did not match and region was locked)
//
    typedef struct {
        BYTE bFunctionCode; // always 0x86
        BYTE bStatus;    //status = 0xF1 for this case
        WORD wSequenceValue; // Same value as in request
        MDWORD dLength;    // # of bytes that follow
        char TheData[ ]    //
} CVP_VERIFY_REGION_RSP, *pCVP_VERIFY_REGION_RSP;
// READ REGION REQUEST
// (sent only when reading from a locked region)
    typedef struct {
        BYTE bFunctionCode; // always 0x07
        BYTE bResv;    //
        WORD wSequenceValue; //
        DWORD dConnectionHandle; // As returned on START_CONNECT
        DWORD dVerifiersFileHandle; // As returned on OPEN_OR_
            CREATE
        MDWORD dSeekValue; //offset into file
        MDWORD dLength;    // number of bytes to read
} CVP_READ_REGION_REQ, *pCVP_READ_REGION_REQ;
//
// READ REGION RESPONSE
//
    typedef struct {
        BYTE bFunctionCode; //always 0x87
        BYTE bStatus;
        WORD wSequenceValue; // Same value as in request
        MDWORD dLength; // # of bytes that follow
        char TheData[ ]; . //
} CVP_READ_REGION_RSP, *pCVP_READ_REGION_RSP;
//
// WRITE REGION REQUEST
// (sent only for when writing to a looked region)
//
    typedef struct {
        BYTE bFuncfionCode; // always 0x08
        BYTE bResv; //
        WORD wSequenceValue; //
        DWORD dConnectionHandle; // As returned on START_CONNECT
        DWORD dverifiersFileHandle; // As returned on OPEN_OR_
            CREATE
        MDWORD dSeekValue; // offset into file
        MDWORD dLength; // number of bytes to write
        BYTE TheData [ ];   // data to be written
} CVP_WRITE_REGION_REQ, *pCVP_WRITE_REGION_REQ;
// WRITE REGION RESPONSE
    typedef struct {
        BYTE bFunctionCode; // always 0x88
        BYTE bStatus;    //status
        WORD wSequenceValue; // Same value as in request
        DWORD dLength; // # of bytes written
} CVP_WRITE_REGION_RSP, *pCVP_WRITE_REGION_RSP;
```

In order to generate the signature, each BSG 44 and 56 employ a procedure for performing a cyclic redundancy check (CRC) on the specified data which includes signature and coordinates (an offset into the file and specifying length of the data). The procedure the BSG employs is a fast method for generating a 64 bit CRC on a 32 bit CPU, which is that of the type "pppfcs32" algorithm described in "RFC1662.TXT" by W. Simpson on the internet at ds.internic.net.

The invention modifies the procedure as follows: The 64 bit value will consist of two parts:

1. The existing 32 bit value will be utilized.
2. An additional 32 bits will be derived by dividing the length by four and performing the operation on four groups of the byte stream. On each of the four instances the least significant 8 bits of the "in progress" frame check sequence (a 32 bit value computed by repetitively exclusive-oring a constant retrieved by indexing a character stream into a table of constants) will be appended to a second 32 bit number which was initialized to zero.

Modification is as follows:

```
/*Function*/ void PppFcs64(cp, len, fcsarray
//
// Calculate an 8 byte FCS
//Note! Do not attempt to use this if the length of the
//data stream is less than eight bytes.
//
//
)
register u32 fcs;
register unsigned char *cp;
register int len, remainder;
register unsigned char fcsarray[8]
{
register int I, lenBy4;
    fcs = 0;
    LenBy4 = len>>2; // Divide length by 4 (shift right 2)
    remainder = len − (LenBy4 + LenBy4 + LenBy4);
    fcs = pppfcs32( fcs, cp, LenBy4);
    fcsarray[4] = (unsigned char)fcs;
    cp += LenBy4;
    fcs = pppfcs32(fcs, cp, LenBy4);
    fcsarray[5] = (unsigned char)fcs;
    cp += LenBy4;
    fcs = pppfcs32(fcs, cp, LenBy4);
    fcsarray[6] = (unsigned char)fcs;
    cp += LenBy4;
    fcs = pppfcs32(fcs, cp, Remainder);
    fcsarray[7] = (unsigned char)fcs;
    *((unsigned long*)fcsarray) = ntohl(fcs);
```

These signatures of data which are generated are placed through the comparator 58, which, for example, are in this case associated with the cache verifying computer 14. It is recognized that other locations for the comparator 34 may exist. The comparator 34 then determines whether the signatures of data match.

It is recognized that other types of verification tools may be employed to carry out the present invention such as the MD5 algorithm which is described in "RFC1321.TXT" by R. Rivest obtainable on the internet at ds.internic.net.

The remote client computer 12 is also preferably designed with a predefined portion of its memory 34 operably associated with the NFC 42 for storing "hit ratio" defined as the percentage of times that a READ request for a particular data was successfully verified to be in cache memory out of a predetermined number of attempted verifications. The remote client computer 12 employs HRA 45 as an operative means which keeps a record of file names that have been determined to be unworthy of caching because previously determined hit ratios fell below the predetermined threshold and, thus, future accesses of the data to such ties will be inhibited from being subject to the processes defined herein. In other words, the HRA 45 removes data from cache memory if the data associated hit ratio was less than a predetermined number, otherwise the data remains in cache memory.

While the preferred embodiment has been set forth above, it is done so only by way of example and not intended to be limiting to the scope of the claims appended hereto. It is believed that modifications and variations of the present invention will be readily apparent to those skilled in the art will be coming within the scope of the claims hereto.

What is claimed is:

1. An apparatus for increased data access in a file oriented network, which comprises:

a file server computer having an operating system, a first memory, a permanent storage memory and a processor;

a cache verifying computer operably connected to said file server computer in a manner to form a network for rapidly transferring data, said cache verifying computer having an operating system, a first memory and a processor with means for performing an operation on data stored in said permanent storage memory of said file server computer to produce a signature of said data;

a remote client computer having an operating system, a first memory, a cache memory and a processor with means for performing an operation on data stored in said cache memory to produce a signature of said data;

a communication server operably connecting to said remote client computer to said cache verifying computer and said file server computer; and a comparator operably associated with said cache verifying computer for comparing said signatures of data with one another to determine whether said signature of data of said remote client is valid.

2. The invention in accordance with claim 1, wherein said network file cacher includes means responsive to each said comparison performed by said comparator on said data for generating and storing a validation ratio for said data in a third memory and for removing said data from said cache memory when said validation ratio drops below a predetermined value.

3. The invention in accordance with claim 2, wherein said storing and removing means is further defined to preclude said data having a validation ratio less than said predetermined value from reentering said cache memory.

4. The invention according to claim 1, wherein said cache verifying computer includes means for recognizing a LOCK request from said remote client computer and for obtaining a lock on said data from said file server computer in response to said LOCK request.

5. The invention in accordance with claim 4, wherein said LOCK recognizing means is further defined as a proxy for said remote client computer for allowing subsequent READ/WRITE requests to occur on behalf of said remote client.

6. The invention in accordance with claim 1, wherein said first memory of said remote client computer is disposed in a RAM of said remote client computer, said first memory of said cache verifying computer is disposed in a RAM of said cache verifying computer, said first memory of said file server computer is disposed in a RAM of said file server computer and said permanent storage memory is disposed on a permanent storage disk of said file server computer and said cache memory is disposed on a permanent storage disk of said remote client computer.

7. The invention in accordance with claim 1, wherein said cache verifying computer has said communications server integrally formed therewith.

8. A method, performed by computers in a file oriented network for increased speed of access of data, which comprises:

using a file server computer having an operating system, a first memory, a permanent storage memory and a processor;

using a cache verifying computer operably connected to said file server computer in a manner to form a network for rapidly transferring data, said cache verifying computer having an operating system, a first memory and a processor;

using a remote client computer having an operating system, a first memory, a cache memory and a processor, using a communication server operably connected to said remote client computer to said cache verifying computer and said file server computer;

establishing a processor element in said cache verifying computer which recognizes a READ request by said remote client computer and obtains said data from said file server computer and performs a CRC upon said data to generate a signature of said data;

establishing a processor element on said remote client computer which initiates upon a READ request from the cache memory to perform a CRC upon said data and produce a signature of said data;

using a comparator operably associated with said cache verifying computer for comparing said signatures of data with one another to determine whether said signature of data of said remote client is valid.

9. The method of the invention in accordance with claim 8, which further includes the steps of:

establishing in said remote client computer a processor element responsive to each said comparison of said signature data;

generating a validation ratio for said data;

storing said validation ratio in a third memory of said remote client computer; and removing said data from said cache memory when said validation ratio drops below a predetermined value.

10. The method of the invention in accordance with claim 9, wherein the step of removing is further characterized to induce preventing said data from reentering said cache memory.

11. The method of the invention in accordance with claim 8, which further includes the steps of:

establishing in said cache verifying computer a processor element responsive to each said LOCK request from said remote client computer; and obtaining a lock on said data from said file server computer in response to said LOCK request.

12. The method of the invention in accordance with claim 8, which further includes the steps of establishing in said verifying computer a processor element responsive to each said READ/WRITE request from said remote client computer, and performing said READ/WRITE request on behalf of said remote client computer.

* * * * *